US010002715B2

United States Patent
Oh et al.

(10) Patent No.: US 10,002,715 B2
(45) Date of Patent: Jun. 19, 2018

(54) ENERGY STORAGE CAPACITOR HAVING COMPOSITE ELECTRODE STRUCTURE

(71) Applicant: SAMHWA CAPACITOR CO., LTD., Yongin-si (KR)

(72) Inventors: Young Joo Oh, Seoul (KR); Jung Rag Yoon, Yongin-si (KR); Byung Gwan Lee, Osan-si (KR)

(73) Assignee: SAMHWA CAPACITOR CO., LTD., Yongin-si (KR)

( * ) Notice: Subject to any disclaimer, the term of this patent is extended or adjusted under 35 U.S.C. 154(b) by 0 days. days.

(21) Appl. No.: 15/493,653

(22) Filed: Apr. 21, 2017

(65) Prior Publication Data

US 2017/0323730 A1 Nov. 9, 2017

(30) Foreign Application Priority Data

May 4, 2016 (KR) ........................ 10-2016-0055354

(51) Int. Cl.
| | |
|---|---|
| *H01G 9/04* | (2006.01) |
| *H01G 9/145* | (2006.01) |
| *H01G 9/008* | (2006.01) |
| *H01G 9/02* | (2006.01) |
| *H01G 9/08* | (2006.01) |
| *H01G 9/048* | (2006.01) |
| *H01G 9/035* | (2006.01) |

(52) U.S. Cl.
CPC ............. *H01G 9/145* (2013.01); *H01G 9/008* (2013.01); *H01G 9/02* (2013.01); *H01G 9/035* (2013.01); *H01G 9/048* (2013.01); *H01G 9/08* (2013.01)

(58) Field of Classification Search
CPC .......... H01G 9/145; H01G 9/008; H01G 9/02; H01G 9/035; H01G 9/048; H01G 9/08; H01G 9/00; H01G 9/004; H02G 3/08; H02G 3/081

USPC ....... 361/511, 500, 538, 523, 540, 517, 525, 361/530, 512; 252/62.2; 174/50, 50.5, 174/50.51, 50.52
See application file for complete search history.

(56) References Cited

U.S. PATENT DOCUMENTS

| | | | | |
|---|---|---|---|---|
| 4,296,458 A | * | 10/1981 | Smith | H01G 9/10 361/518 |
| 4,377,404 A | * | 3/1983 | Hoshikawa | H01G 9/10 174/137 B |
| 6,970,343 B2 | * | 11/2005 | Hayashi | H01G 9/02 361/511 |

(Continued)

FOREIGN PATENT DOCUMENTS

KR 101142403 5/2012

*Primary Examiner* — Angel R Estrada
(74) *Attorney, Agent, or Firm* — Cantor Colburn LLP (57) ABSTRACT

An energy storage capacitor having a composite electrode structure includes: a case; a rolled body arranged inside the case; and an electrolyte stored inside the case. The rolled body includes: a first anode foil having a first anode lead plate connected at one side of one surface, a first cathode foil arranged to face the other surface of the first cathode foil with the one surface of the first anode foil and a first cathode lead plate connected at the other side, a second cathode foil arranged to face the other surface of the second cathode foil with one surface of the first cathode foil and having a second cathode lead plate connected at one side of one surface, a second anode foil arranged to face the one surface of the second cathode foil and a second anode lead plate connected at the other side.

7 Claims, 6 Drawing Sheets

(56) References Cited

U.S. PATENT DOCUMENTS

| | | | |
|---|---|---|---|
| 8,320,104 B2 * | 11/2012 | Fujimoto | H01G 9/012 361/530 |
| 8,644,004 B2 * | 2/2014 | Kawakubo | H01G 9/008 361/511 |
| 8,654,511 B2 * | 2/2014 | Chiu | H01G 9/15 361/541 |
| 8,953,304 B2 * | 2/2015 | Kato | H01G 9/02 361/523 |

* cited by examiner

ENERGY STORAGE CAPACITOR HAVING COMPOSITE ELECTRODE STRUCTURE

CROSS REFERENCE TO RELATED APPLICATION

This application claims the benefit of Korean Patent Application No. 10-2016-0055354, filed on May 04, 2016, in Korean Intellectual Property Office, the disclosure of which is incorporated herein by reference.

BACKGROUND OF THE INVENTION

1. Technical Field

The present invention relates to an energy storage capacitor having a composite electrode structure, and particularly, to an energy storage capacitor having a composite electrode structure, which can increase capacitance compared with an electric double layer capacitor and increase output compared with a hybrid capacitor by internally connecting electrodes of the electric double layer capacitor and electrodes of the hybrid capacitor in parallel within a case.

2. Description of the Related Art

An energy storage system is configured of a combination of a battery and an electric double layer capacitor (EDLC), a combination of a battery and a hybrid capacitor or the like. The battery used in the energy storage system may be a lithium ion battery or the like, and since the battery has a disadvantage of low output density although its energy density is high, an energy storage system used to compensate high peaks cannot be implemented using only one type of battery.

The hybrid capacitor is configured to have an anode electrode and a cathode electrode of different materials. That is, since the hybrid capacitor uses activated carbon, carbon nanotubes, porous carbon or the like as an anode electrode material and uses lithium titanium oxide (LTO) or hydrogen titanium oxide (HTO) as a cathode electrode material to have an intermediate electric characteristic between the electric double layer capacitor and the battery, it is not easy to configure an energy storage system using only one type of hybrid capacitor.

The electric double layer capacitor uses activated carbon, carbon nanotubes, porous carbon or the like as an anode or cathode electrode material, and a detailed configuration thereof is disclosed in Korean Patent Registration No. 10-1142403.

The electric double layer capacitor disclosed in the Patent Document 1 comprises an external case, a rolled component, a terminal plate and a gasket.

The external case has a beading unit, i.e., a bent portion, formed on the outer wall and sunk inward, and the rolled component is arranged inside the external case and positioned under the beading unit, and in addition, terminals respectively connected to the electrodes of the rolled component having polarities different from each other, i.e., internal terminals positioned inside the external case, are provided. The terminal plate is arranged on the beading unit to be engaged with external terminals connected to the internal terminals, and the gasket is formed of an insulation material and arranged to be positioned under the beading unit to cover the top side of the rolled component, and penetration holes are formed to connect the internal terminals connected to the rolled component with the external terminals.

Since the conventional electric double layer capacitor disclosed in the Patent Document 1 has a disadvantage of low energy density although the output density is high since it stores electric charges through physical adsorption and desorption of ions, there is a problem in that it is not easy to configure an energy storage system using only one type of electric double layer capacitor.

(Patent Document 1) Korean Patent Registration No. 10-1142403

SUMMARY OF THE INVENTION

Therefore, the present invention has been made in view of the above problems, and it is an object of the present invention to provide an energy storage capacitor having a composite electrode structure, which can increase capacitance compared with an electric double layer capacitor and increase output compared with a hybrid capacitor by internally connecting electrodes of the electric double layer capacitor and electrodes of the hybrid capacitor in parallel within a case.

Another object of the present invention is to provide an energy storage capacitor having a composite electrode structure, which can improve the characteristic of equivalent series resistance by internally connecting electrodes of the electric double layer capacitor and electrodes of the hybrid capacitor in parallel within a case.

An energy storage capacitor having a composite electrode structure of the present invention includes: a case; a rolled body arranged inside the case; and an electrolyte stored inside the case, wherein the rolled body includes: a first anode foil having a first anode lead plate connected at one side of one surface and an activated carbon layer formed at the other side, a first cathode foil arranged to face the other surface of the first cathode foil with the one surface of the first anode foil and having an activated carbon layer formed at one side of the other surface and a first cathode lead plate connected at the other side, a second cathode foil arranged to face the other surface of the second cathode foil with one surface of the first cathode foil and having a second cathode lead plate connected at one side of one surface and a lithium titanium oxide (LTO) layer formed at the other side, a second anode foil arranged to face the one surface of the second cathode foil and having an activated carbon layer formed at one side and a second anode lead plate connected at the other side, and a plurality of separators respectively arranged between the first anode foil, the first cathode foil, the second cathode foil and the second anode foil, wherein the first anode lead plate is electrically connected to the second anode lead plate, and the first cathode lead plate is electrically connected to the second cathode lead plate.

BRIEF DESCRIPTION OF THE DRAWINGS

The above and/or other aspects of the present invention will become apparent and more readily appreciated from the following description of the exemplary embodiments, taken in conjunction with the accompanying drawings in which.

DETAILED DESCRIPTION

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

An embodiment of an energy storage capacitor having a composite electrode structure of the present invention will be hereafter described in detail with reference to the accompanying drawings.

Figure 1:
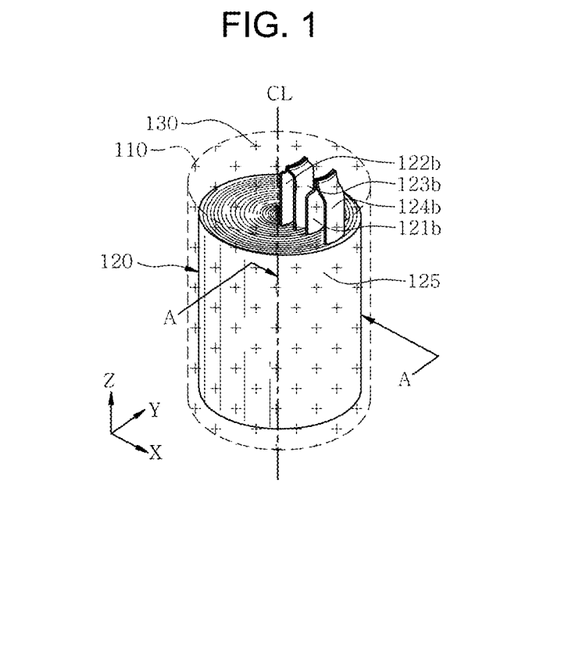
FIG. 1 is a perspective view showing an assembly of an energy storage capacitor having a composite electrode structure of the present invention.
Figure 2:
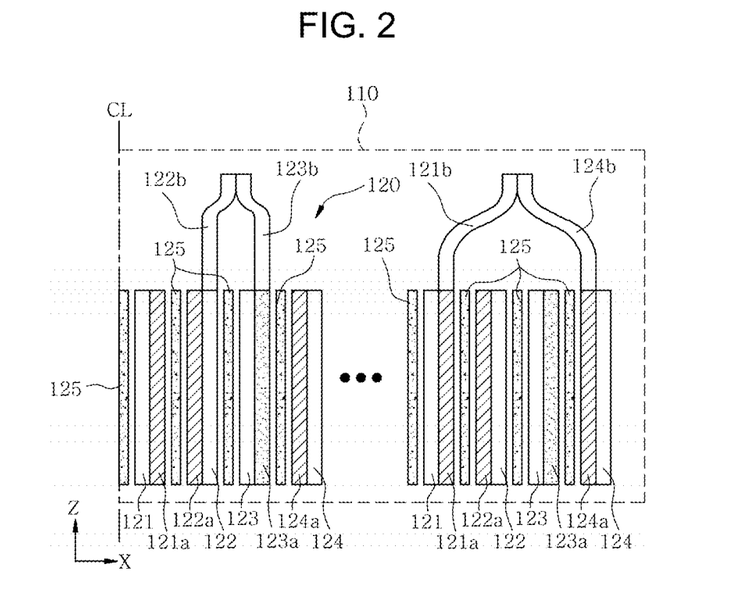
FIG. 2 is a view schematically showing the rolled body of FIG. 1 taken along the line A-A.
Figure 3:
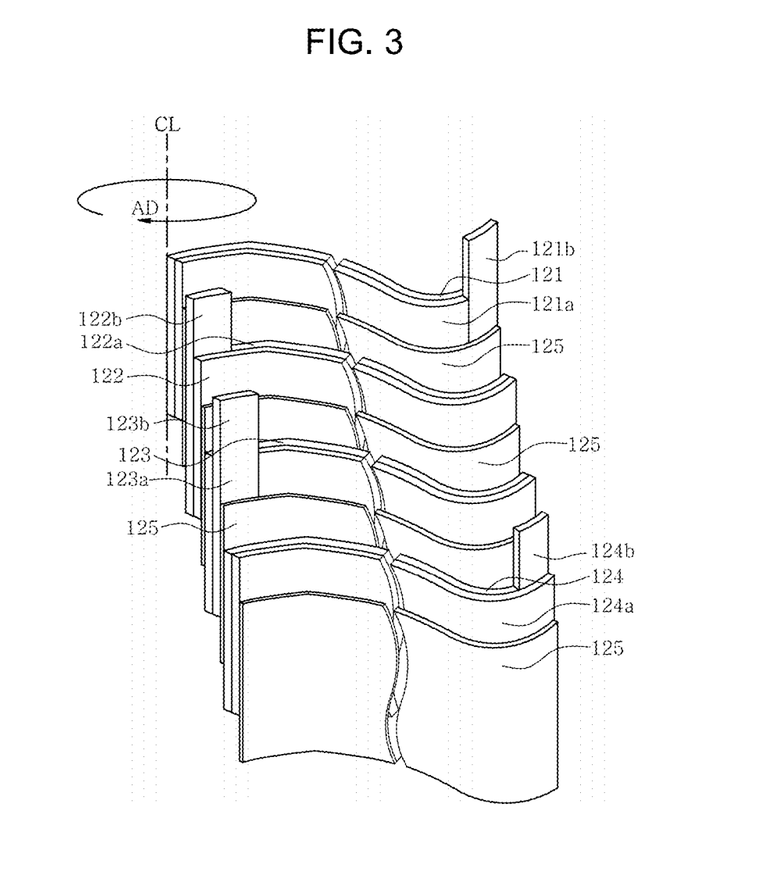
FIG. 3 is an exploded perspective view showing the rolled body of FIG. 1.

As shown in FIGS. 1 to 3, an energy storage capacitor having a composite electrode structure of the present invention is configured to include a case 110, a rolled body 120 and an electrolyte 130.

The case 110 generally supports the energy storage capacitor having a composite electrode structure of the present invention, and the rolled body 120 is arranged inside the case 110. The electrolyte 130 is stored inside the case 110. Among these components, the rolled body 120 is impregnated in the electrolyte 130 stored inside the case 110 and is configured to include a first anode foil 121, a first cathode foil 122, a second cathode foil 123, a second anode foil 124 and a plurality of separators 125.

The first anode foil 121 has a first anode lead plate 121b connected at one side of one surface and an activated carbon layer 121a formed at the other side, and the first anode lead plate 121b is electrically connected to a second anode lead plate 124b. The first cathode foil 122 is arranged to face the other surface of the first cathode foil 122 with the one surface of the first anode foil 121 and has an activated carbon layer 122a formed at one side of the other surface and a first cathode lead plate 122b connected at the other side, and the first cathode lead plate 122b is electrically connected to a second cathode lead plate 123b. The second cathode foil 123 is arranged to face the other surface of the second cathode foil 123 with one surface of the first cathode foil 122 and has the second cathode lead plate 123b connected at one side of one surface and a lithium titanium oxide (LTO) layer 123a formed at the other side. The second anode foil 124 is arranged to face the one surface of the second cathode foil 123 and has an activated carbon layer 124a formed at one side and the second anode lead plate 124b connected at the other side. The plurality of separators 125 is arranged between the first anode foil 121, the first cathode foil 122, the second cathode foil 123 and the second anode foil 124, respectively.

The configuration of the energy storage capacitor having a composite electrode structure of the present invention is described in detail below.

The case 110 is formed in a cylindrical shape as shown in FIG. 1, and an insulating material is used. A metallic cylindrical case with an insulated inner surface may be used as the case 110.

The rolled body 120 is arranged inside the case 110 as shown in FIGS. 1 and 2 and is configured to include a first anode foil 121, a first cathode foil 122, a second cathode foil 123, a second anode foil 124 and a plurality of separators 125. That is, as shown in FIG. 3, the rolled body 120 is assembled by arranging the first anode foil 121, the first cathode foil 122, the second cathode foil 123, the second anode foil 124 and the plurality of separators 125 with respect to the center line CL of the energy storage capacitor having a composite electrode structure of the present invention and rolling them in the arrow direction AD shown in FIG. 3.

Figure 4:
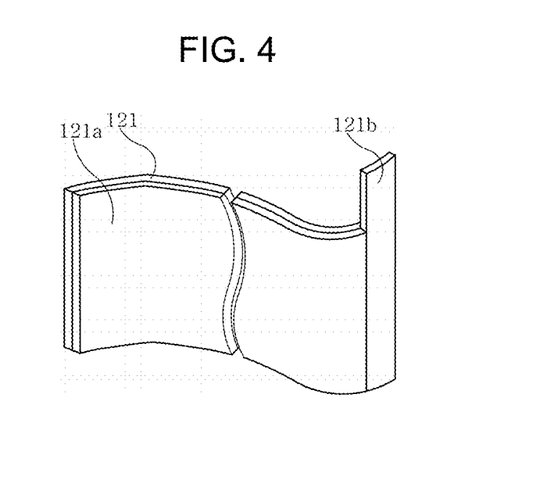
FIG. 4 is a perspective view showing the first anode foil of FIG. 3.

The first anode foil 121 configuring the rolled body 120 has a first anode lead plate 121b connected at one side of one surface and an activated carbon layer 121a formed at the other side as shown in FIGS. 2, 3 and 4. That is, the activated carbon layer 121a is formed to be applied at one side of the activated carbon layer 121a, and the first anode lead plate 121b is adhered at the other side of the one surface of the first anode foil 121, on which the activated carbon layer 121a is formed, to be protruded in the upper direction Z using a conductive adhesive, laser welding or publicized cold pressing and is electrically connected to the first anode foil 121. The first anode lead plate 121b is bonded and electrically connected to the second anode lead plate 124b inside the case 110 using publicized laser welding or cold pressing.

Figure 5:
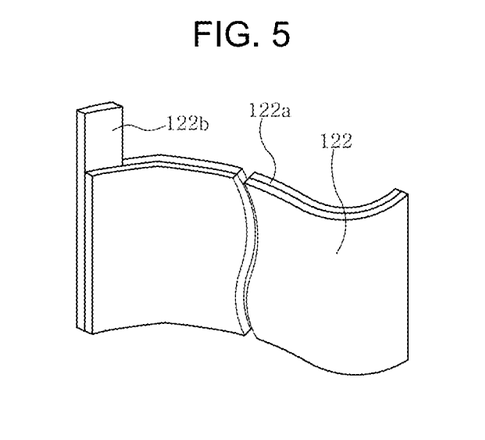
FIG. 5 is a perspective view showing the first cathode foil of FIG. 3.

The first cathode foil 122 is arranged to face the other surface of the first cathode foil 122 with the one surface of the first anode foil 121 as shown in FIGS. 2, 3 and 5 and has an activated carbon layer 122a formed at one side of the other surface and a first cathode lead plate 122b connected at the other side. For example, since the first cathode foil 122 is arranged to face the other surface, on which the activated carbon layer 122a is formed, with the first anode foil 121, the activated carbon layer 122a is arranged to face the activated carbon layer 121a of the first anode foil 121. The first cathode lead plate 122b is arranged at the other side of the activated carbon layer 122a, i.e., arranged to be spaced apart from the first anode lead plate 121b in the length direction of the first anode foil 121 or the first cathode foil 122, adhered to be protruded in the upper direction Z using a conductive adhesive, laser welding or publicized cold pressing, and electrically connected to the second cathode lead plate 123b. Here, the first anode lead plate 121b connected to the first anode foil 121 and the first cathode lead plate 122b connected to the first cathode foil 122 are insulated from each other by the separator 125 arranged between the first anode foil 121 and the first cathode foil 122 to prevent electrical connection by contact.

An electric double layer capacitor is configured by arranging the first anode foil 121 and the first cathode foil 122 to face the activated carbon layers 121a and 122a respectively formed therein with each other as described above.

Figure 6:
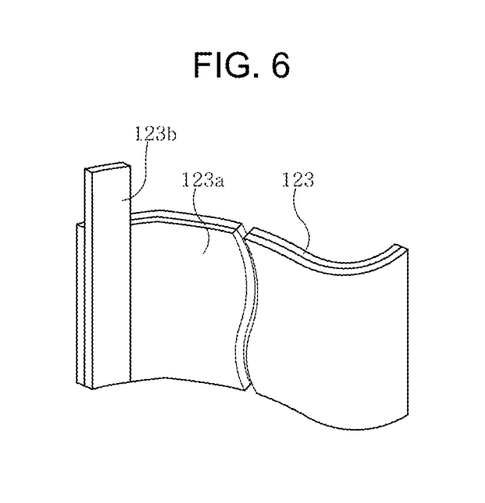
FIG. 6 is a perspective view showing the second cathode foil of FIG. 3.

The second cathode foil 123 is arranged to face the other surface of the second cathode foil 123 with one surface of the first cathode foil 122 as shown in FIGS. 2, 3 and 6 and has a second cathode lead plate 123b connected at one side of one surface and a lithium titanium oxide (LTO) layer 123a formed at the other side. The second cathode foil 123 is arranged to face the surface of the first cathode foil 122 on which the activated carbon layer 122a is not formed, i.e., the one surface of the first cathode foil 122, with the other surface of the second cathode foil 123. A material of the LTO layer 123a formed on the second cathode foil 123 is formed by mixing $Li_4Ti_5O_{12}$, a conducting material and a binder, and one of Super-P, ketjen black and carbon black is used as the conducting material, and a mixture of at least one or more of polyvinylidene difluoride (PVDF), polytetrafluoroethylene (PTFE), styrene butadiene rubber (SBR) and carboxymethylcellulose (CMC) is used as the binder. The second cathode lead plate 123b is adhered on the other surface of the second cathode foil 123 to be protruded in the upper direction Z using a conductive adhesive, laser welding or publicized cold pressing at the other side of the LTO layer 123a, i.e., at the other side of the second cathode lead plate 123b, and is electrically connected to the second cathode foil 123.

Figure 7:
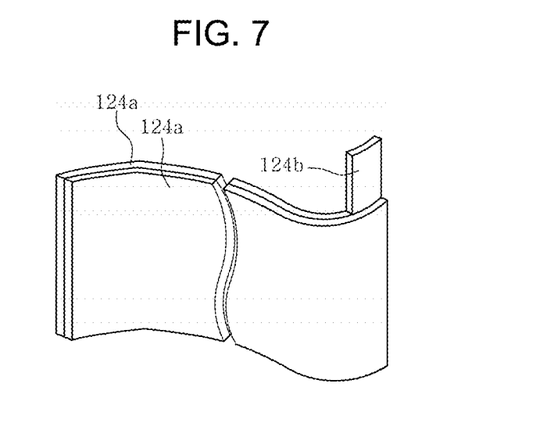
FIG. 7 is a perspective view showing the second anode foil of FIG. 3.

The second anode foil 124 is arranged to face one surface of the second cathode foil 123 and has an activated carbon layer 124a formed at one side and a second anode lead plate 124b connected at the other side as shown in FIGS. 2, 3 and 7. That is, the second anode foil 124 is arranged to face the activated carbon layer 124a with the LTO layer 123a formed on the second cathode foil 123. The second anode lead plate 124b is arranged at the other side of the activated carbon layer 124a, i.e., arranged to be spaced apart from the second cathode lead plate 123b in the length direction of the second cathode foil 123 or the second anode foil 124, adhered on the other surface of the second anode foil 124 to be protruded in the upper direction Z using a conductive adhesive, laser welding or publicized cold pressing, and electrically connected to the second anode foil 124.

A hybrid capacitor structure is formed by arranging the second cathode foil 123 and the second anode foil 124 to face the LTO layer 123a and the activated carbon layer 124a with each other as described above, and inside the case 110, the second cathode lead plate 123b is electrically connected to the first cathode lead plate 122b, and the second anode lead plate 124b is electrically connected to the first anode lead plate 121b.

A metal foil is used for the first anode foil 121, the first cathode foil 122, the second cathode foil 123 and the second anode foil 124 connected in parallel, and any one of aluminum Al, nickel Ni and copper Cu is used as a material of the metal foil. In addition, a material of the activated carbon layers 121a, 122a and 124a respectively formed on the first anode foil 121, the first cathode foil 122 and the second anode foil 124 is formed by mixing activated carbon, a conducting material and a binder, and one of Super-P, ketjen black and carbon black is used as the conducting material, and a mixture of at least one or more of polyvinylidene difluoride (PVDF), polytetrafluoroethylene (PTFE), styrene butadiene rubber (SBR) and carboxymethylcellulose (CMC) is used as the binder.

Figure 8:
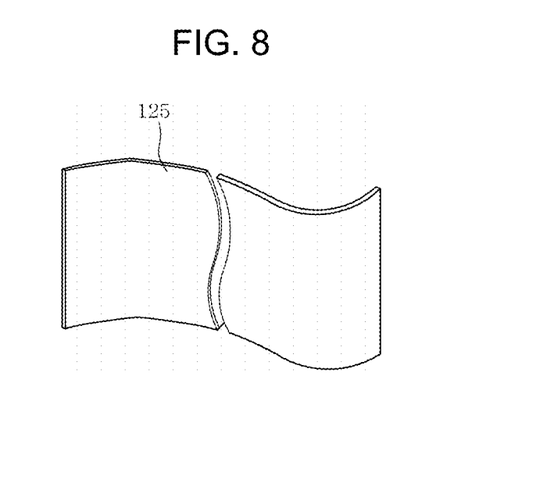
FIG. 8 is a perspective view showing the separator of FIG. 3.

The plurality of separators 125 is respectively arranged on the other surface of the first anode foil 121, between the first anode foil 121 and the first cathode foil 122, between the first cathode foil 122 and the second cathode foil 123 and between the second cathode foil 123 and the second anode foil 124 as shown in FIGS. 2, 3 and 8 to improve insulation performance between the inner periphery of the case 110 and the rolled body 120 and prevent physical contact between the separately provided activated carbon layers 121a, 122a and 124a and the LTO layer 123a. In addition, the plurality of separators 125 prevents electrical connection between the first anode lead plate 121b, the first cathode lead plate 122b, the second cathode lead plate 123b and the second anode lead plate 124b by insulating them from each other in the areas contacting with the first anode foil 121, the first cathode foil 122, the second cathode foil 123 and the second anode foil 124. That is, the plurality of separators 125 is sequentially arranged to face the other surface of the first anode foil 121, arranged between the other surface of the first anode foil 121 and the one surface of the first cathode foil 122, arranged between the other surface of the first cathode foil 122 and the one surface of the second cathode foil 123, and arranged between the other surface of the second cathode foil 123 and the one surface of the second anode foil 124.

As shown in FIG. 1, a mixture of 50 to 90wt % of 1 to 2M (mol/L) lithium salt and 10 to 50wt % of 0.1 to 1M (mol/L) of non-lithium salt is used as the electrolyte 130. A mixture of one or two or more of $LiBF_4$, $LiPF_6$, $LiClO_4$, $LiAsF_6$, $LiAlCl_4$, $LiCF_\square SO_3$, $LiN(SO_2CF_3)_2$, $LiC(SO_2CF_3)_3$ and LiBOB (Lithium bis (oxalato) borate) is used as the lithium salt, and a mixture of one or two or more of $TEABF_4$ (tetraethylammonium tetrafluoroborate), $TEMABF_4$ (triethylmethylammonium tetrafluorborate) and $SBPBF_4$ (spiro-(1,1')-bipyrrolidium tetrafluoroborate) is used as the non-lithium salt.

As described above, since an electric double layer capacitor is configured by arranging the first anode foil 121 and the first cathode foil 122 to face the activated carbon layers 121a and 122a respectively formed thereon with each other and a hybrid capacitor structure is formed by arranging the second cathode foil 123 and the second anode foil 124 to face the LTO layer 123a and the activated carbon layer 124a with each other, the energy storage capacitor having a composite electrode structure of the present invention has a structure of connecting an electric double layer capacitor and a hybrid capacitor in parallel to each other.

The energy storage capacitor having a composite electrode structure of the present invention has an electric double layer capacitor and a hybrid capacitor connected in parallel inside the case 110. For example, the first cathode lead plate 122b connected to the first cathode foil 122 and the second cathode lead plate 123b connected to the second cathode foil 123 are electrically connected to each other at a position adjacent to the center line CL of each energy storage capacitor, i.e., the center line CL of the rolled body 120, and the first anode lead plate 121b connected to the first anode foil 121 and the second anode lead plate 124b connected to the second anode foil 124 are electrically connected to each other at a position adjacent to the outer periphery of the rolled body 120 to be insulated from the first cathode lead plate 122b and the second cathode lead plate 123b, and thus an electric double layer capacitor and a hybrid capacitor are connected to each other in parallel inside the case 110.

Electrical performance of the energy storage capacitor having a composite electrode structure of the present invention has been tested. For the electrical performance test of the energy storage capacitor having a composite electrode structure of the present invention, an energy storage capacitor having a composite electrode structure of the structure described above is manufactured, and particularly, for the test of the electrical performance of the energy storage capacitor having a composite electrode structure of the present invention, the energy storage capacitor having a composite electrode structure of the present invention is manufactured in the shape of a cylindrical can having a size of Φ22×45 mm, and the electrolyte is manufactured by mixing 0.75M LiBF$_4$ and 0.75M TEABF$_4$ (hereinafter, referred to as a 'second sample'), and a comparison target energy storage capacitor is manufactured using only 1.5M LiBF$_4$ of electrolyte in a structure the same as that of the energy storage capacitor having a composite electrode structure of the present invention (hereinafter, referred to as a 'first sample'). An organic solvent and an additive are mixed to the electrolyte using a mixture ratio of a publicized electrolyte manufacturing method. Acetonitrile (ACN) is used as the organic solvent contained in the electrolyte of the present invention, and vinylene carbonate (VC) is used as the additive. A result of testing the electrical performance performed on the first sample and the second sample is shown in FIGS. 9 to 12.

TABLE 1

| Composition of electrolyte | Ratio of change compared with 1A | | | | | | | |
|---|---|---|---|---|---|---|---|---|
| | Capacitance change ratio | | | | Resistance change ratio | | | |
| | 1A | 10A | 15A | 20A | 5A | 10A | 15A | 20A |
| 1.5M LiBF$_4$/ACN | 93% | 90% | 87% | 85% | 105% | 104% | 103% | 101% |
| 0.75M LiBF$_4$ + 0.75M TEABF$_4$/ACN | 92% | 89% | 87% | 85% | 102% | 101% | 100% | 100% |

Figure 9:
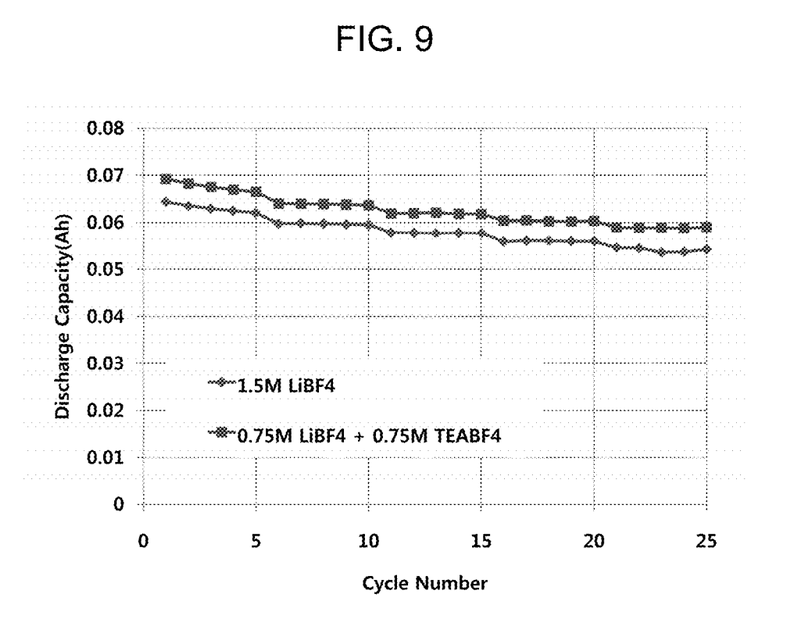
FIG. 9 is a graph showing a result of testing capacitance of an energy storage capacitor having a composite electrode structure of the present invention.
Figure 10:
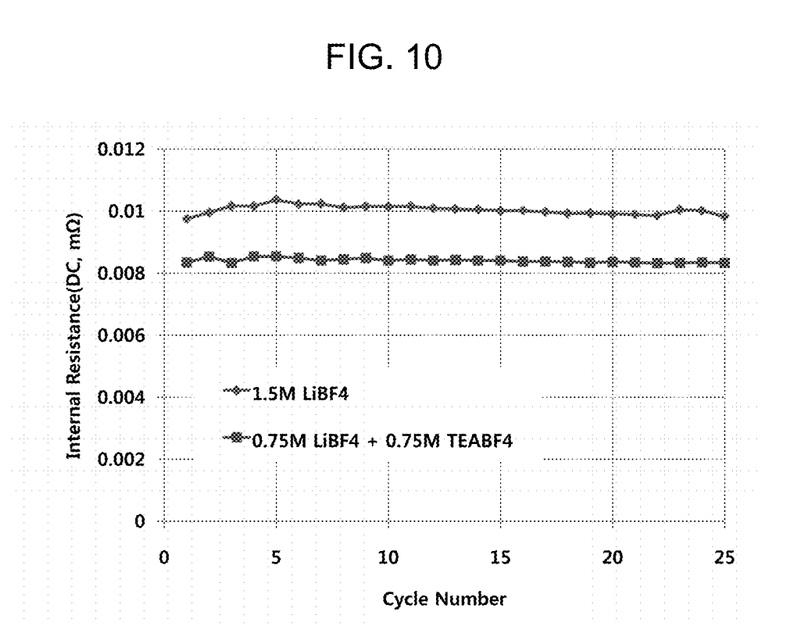
FIG. 10 is a graph showing a result of testing the characteristic of internal resistance of an energy storage capacitor having a composite electrode structure of the present invention.

FIG. 9 is a graph showing a result of testing capacitance of an energy storage capacitor having a composite electrode structure of the present invention, and FIG. 10 is a graph showing a result of testing the characteristic of internal resistance of an energy storage capacitor having a composite electrode structure of the present invention. The test results respectively shown in FIGS. 9 and 10 are measured while changing the cycle number from 0 to 25 and changing the current from 1A (ampere) to 5A, 10A, 15A and 20A. As shown in FIG. 9, the characteristic of the discharge capacity (Ah) is shown to be high in the first sample (a mixture of 0.75M LiBF$_4$ and 0.75M TEABF$_4$ is used as the electrolyte) compared with the second sample (0.75M LiBF$_4$ of electrolyte is used), and as shown in FIG. 10, the first sample also shows a characteristic of the internal resistance (DC, MΩ) lower than that of the second sample. In addition, as shown in the table, the capacitance change ratio and the resistance change ratio are respectively tested to be low in the first sample compared with the second sample.

Figure 11:
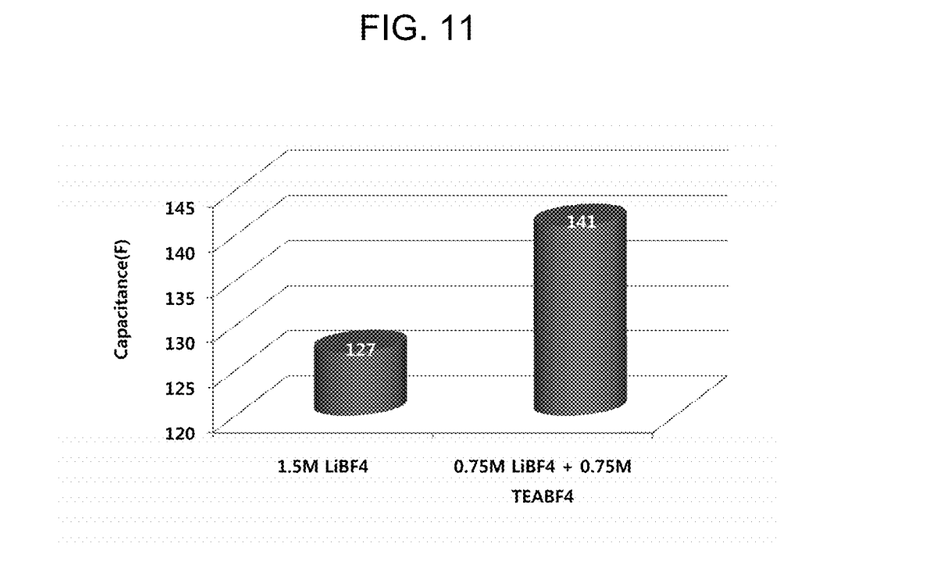
FIG. 11 is a graph showing a result of testing the capacitance of an energy storage capacitor having a composite electrode structure of the present invention.
Figure 12:
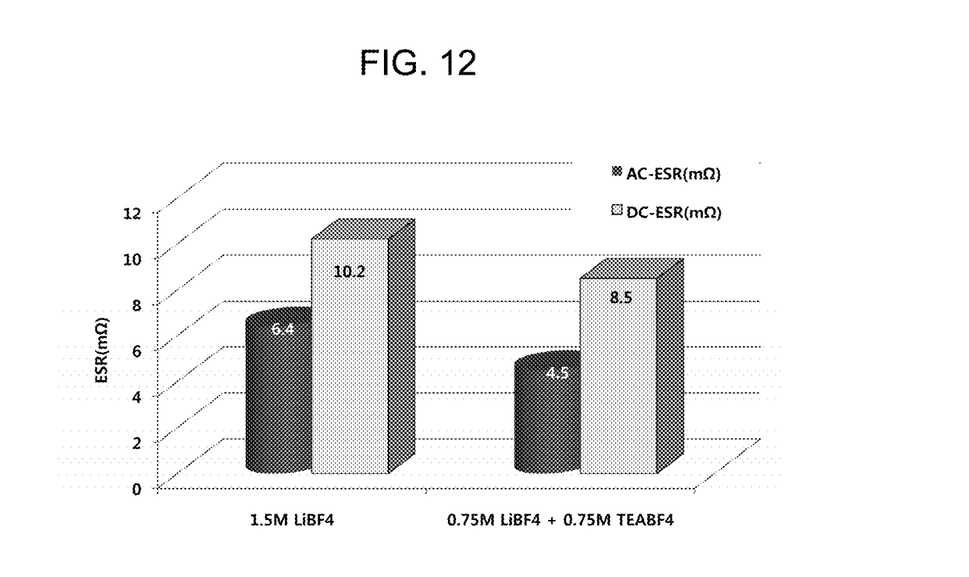
FIG. 12 is a graph showing the characteristic of equivalent series resistance of an energy storage capacitor having a composite electrode structure of the present invention.

FIG. 11 is a graph showing a result of testing the capacitance of an energy storage capacitor having a composite electrode structure of the present invention, and FIG. 12 is a graph showing the characteristic of equivalent series resistance of an energy storage capacitor having a composite electrode structure of the present invention. The test results shown in FIGS. 11 and 12 are results of testing the capacitance and the equivalent series resistance (ESR) after charge and discharge at 1A.

In the result of testing the capacitance F as shown in FIG. 11, the capacitance of the first sample is tested to be 141F, and the capacitance of the second sample is tested to be 127F, and thus the capacitance of the first sample is measured to be higher than that of the second sample. The capacitances of the first sample and the second sample have increased 20 to 40% compared with that of the conventional electric double capacitor, and here, the conventional electric double capacitor is manufactured and tested in a size the same as that of the energy storage capacitor having a composite electrode structure of the present invention.

The result of testing the equivalent series resistance (ESR) is divided into a result of testing the equivalent series resistance for alternating current AC-ESR and a result of testing the equivalent series resistance for direct current DC-ESR. As a result of the test, the equivalent series resistance for alternating current AC-ESR and the equivalent series resistance for direct current DC-ESR of the first sample are measured to be lower than those of the second sample. The equivalent series resistances of the first sample and the second sample for alternating current AC-ESR have decreased 10% or more compared with that of the conventional electric double capacitor. Here, the conventional electric double capacitor is manufactured and tested in a size the same as that of the energy storage capacitor having a composite electrode structure of the present invention.

As is described above, the energy storage capacitor having a composite electrode structure of the present invention may increase capacitance compared with an electric double layer capacitor and increase output compared with a hybrid capacitor by internally connecting electrodes of the electric double layer capacitor and electrodes of the hybrid capacitor in parallel within a case and may improve the characteristic of equivalent series resistance by internally connecting the electrodes of the electric double layer capacitor and the electrodes of the hybrid capacitor in parallel within the case.

The energy storage capacitor having a composite electrode structure of the present invention may be applied in an industrial field of manufacturing a capacitor or an energy storage system. The energy storage capacitor having a composite electrode structure of the present invention has an advantage of increasing capacitance compared with an electric double layer capacitor and increasing output compared with a hybrid capacitor by internally connecting electrodes of the electric double layer capacitor and electrodes of the hybrid capacitor in parallel within a case and has an advantage of improving the characteristic of equivalent series resistance by internally connecting the electrodes of the electric double layer capacitor and the electrodes of the hybrid capacitor in parallel within the case.

What is claimed is:

1. An energy storage capacitor having a composite electrode structure, the capacitor comprising:
   a case;
   a rolled body arranged inside the case; and
   an electrolyte stored inside the case, wherein
   the rolled body includes:
   a first anode foil having a first anode lead plate connected at one side of one surface and an activated carbon layer formed at the other side,
   a first cathode foil arranged to face the other surface of the first cathode foil with the one surface of the first anode foil and having an activated carbon layer formed at one side of the other surface and a first cathode lead plate connected at the other side,
   a second cathode foil arranged to face the other surface of the second cathode foil with one surface of the first cathode foil and having a second cathode lead plate connected at one side of one surface and a lithium titanium oxide (LTO) layer formed at the other side,
   a second anode foil arranged to face the one surface of the second cathode foil and having an activated carbon layer formed at one side and a second anode lead plate connected at the other side, and a plurality of separators respectively arranged between the first anode foil, the first cathode foil, the second cathode foil and the second anode foil, wherein the first anode lead plate is electrically connected to the second anode lead plate, and the first cathode lead plate is electrically connected to the second cathode lead plate.

2. The capacitor according to claim 1, wherein the case is formed in a cylindrical shape, and its material is an insulating material.

3. The capacitor according to claim 1, wherein a metal foil is used for the first anode foil, the first cathode foil, the second cathode foil and the second anode foil, and a material of the metal foil is any one of aluminum Al, nickel Ni and copper Cu.

4. The capacitor according to claim 1, wherein a material of the activated carbon layers respectively formed on the first anode foil, the first cathode foil and the second anode foil is formed by mixing activated carbon, a conducting material and a binder, wherein one of Super-P, ketjen black and carbon black is used as the conducting material, and a mixture of at least one or more of polyvinylidene difluoride (PVDF), polytetrafluoroethylene (PTFE), styrene butadiene rubber (SBR) and carboxymethylcellulose (CMC) is used as the binder.

5. The capacitor according to claim 1, wherein a material of the LTO layer formed on the second cathode foil is formed by mixing $Li_4Ti_5O_{12}$, a conducting material and a binder, wherein one of Super-P, ketjen black and carbon black is used as the conducting material, and a mixture of at least one or more of polyvinylidene difluoride (PVDF), polytetrafluoroethylene (PTFE), styrene butadiene rubber (SBR) and carboxymethylcellulose (CMC) is used as the binder.

6. The capacitor according to claim 1, wherein the plurality of separators is sequentially arranged to face the other surface of the first anode foil, arranged between the other surface of the first anode foil and the one surface of the first cathode foil, arranged between the other surface of the first cathode foil and the one surface of the second cathode foil, and arranged between the other surface of the second cathode foil and the one surface of the second anode foil.

7. The capacitor according to claim 1, wherein a mixture of 50 to 90wt % of 1 to 2M (mol/L) lithium salt and 10 to 50wt % of 0.1 to 1M (mol/L) of non-lithium salt is used as the electrolyte, wherein a mixture of one or two or more of $LiBF_4$, $LiPF_6$, $LiClO_4$, $LiAsF_6$, $LiAlCl_4$, $LiCF_\square SO_3$, $LiN(SO_2CF_3)_2$, $LiC(SO_2CF_3)_3$ and LiBOB (Lithium bis (oxalato) borate) is used as the lithium salt, and a mixture of one or two or more of $TEABF_4$ (tetraethylammonium tetrafluoroborate), $TEMABF_4$ (triethylmethylammonium tetrafluoroborate) and $SBPBF_4$ (spiro-(1,1')-bipyrrolidium tetrafluoroborate) is used as the non-lithium salt.

* * * * *